United States Patent [19]

Olliges et al.

[11] 3,831,172

[45] Aug. 20, 1974

[54] SOLID-STATE SOUND EFFECT GENERATING SYSTEM

[75] Inventors: William E. Olliges, Arlington Heights; Edward L. Polanek, Glendale Heights, both of Ill.

[73] Assignee: Universal Research Laboratories, Incorporated, Elk Grove Village, Ill.

[22] Filed: Jan. 3, 1972

[21] Appl. No.: 215,025

[52] U.S. Cl. ............ 340/384 E, 273/1 E, 273/85 R, 272/14, 317/101 CC, 84/1.11, 35/12 Q

[51] Int. Cl. ............ G08b 3/00

[58] Field of Search ........ 340/384 E, 221, 225, 328; 272/14; 35/11, 12 Q, 12 N; 317/101 D, 101 CM, 101 CC, 101 DH; 273/1 E, 130 AB, 86 B, 85 R; 84/1.01, 1.11, 1.17, 1.19, 470

[56] References Cited

UNITED STATES PATENTS

| | | | |
|---|---|---|---|
| 3,057,083 | 10/1962 | Franck | 35/12 Q |
| 3,520,982 | 7/1970 | Malmfors | 84/1.01 |
| 3,562,396 | 7/1969 | Peterson | 84/1.01 |
| 3,567,998 | 5/1971 | Ammerman | 317/101 DH |
| 3,573,651 | 4/1971 | Engelbrecht | 331/56 |
| 3,627,140 | 12/1971 | Yanikoski | 317/101 DH X |
| 3,662,225 | 5/1972 | Carter et al. | 317/101 D |
| 3,704,394 | 11/1972 | Johnson | 317/101 DH |

*Primary Examiner*—John W. Caldwell
*Assistant Examiner*—William M. Wannisky
*Attorney, Agent, or Firm*—Fitch, Even, Tabin & Luedeka

[57] ABSTRACT

A solid-state sound effect generating system for selectively producing any one of a plurality of predetermined sound effects has a plurality of interchangeable plug-in printed circuit boards each having mounted thereon an electronic circuit capable of being actuated to produce an electrical output signal representative of a unique one of a group of desired sound effects, without the use of any prerecorded signals or recording medium. The circuit boards are plugged into a common control chassis which interconnects them with an audio power amplifier and loudspeaker arrangement and which further provides input terminals for external triggering signals.

4 Claims, 8 Drawing Figures

FIG. 1
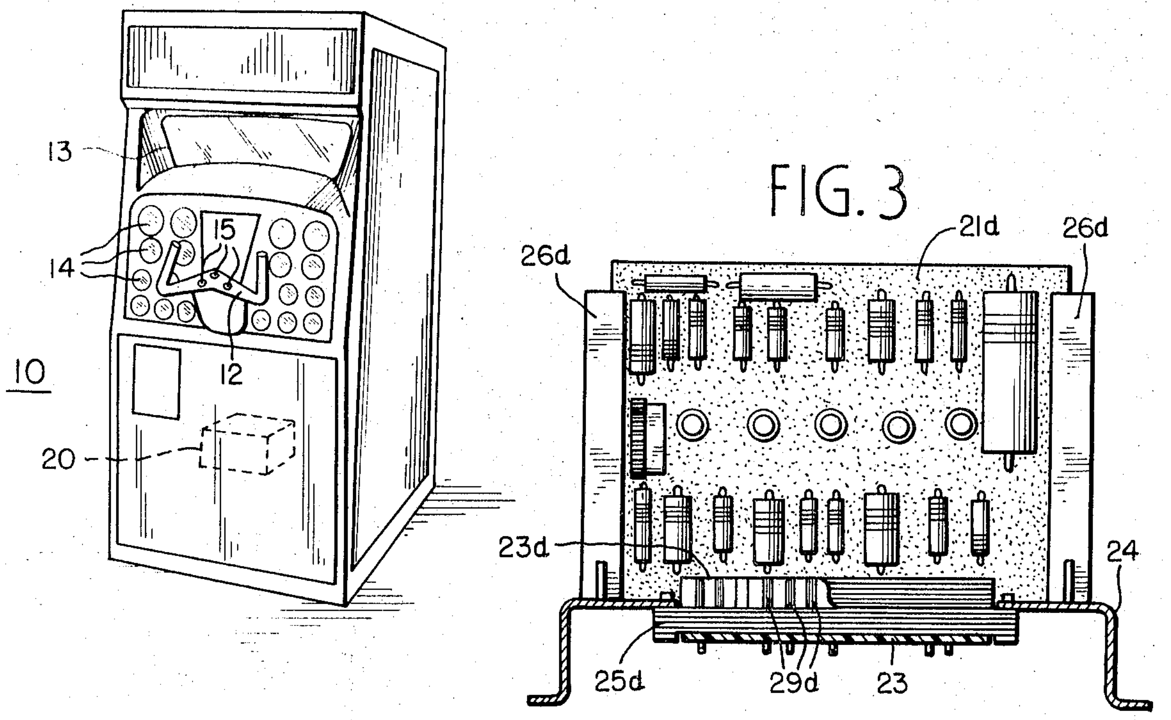
FIG. 1, FIG. 3
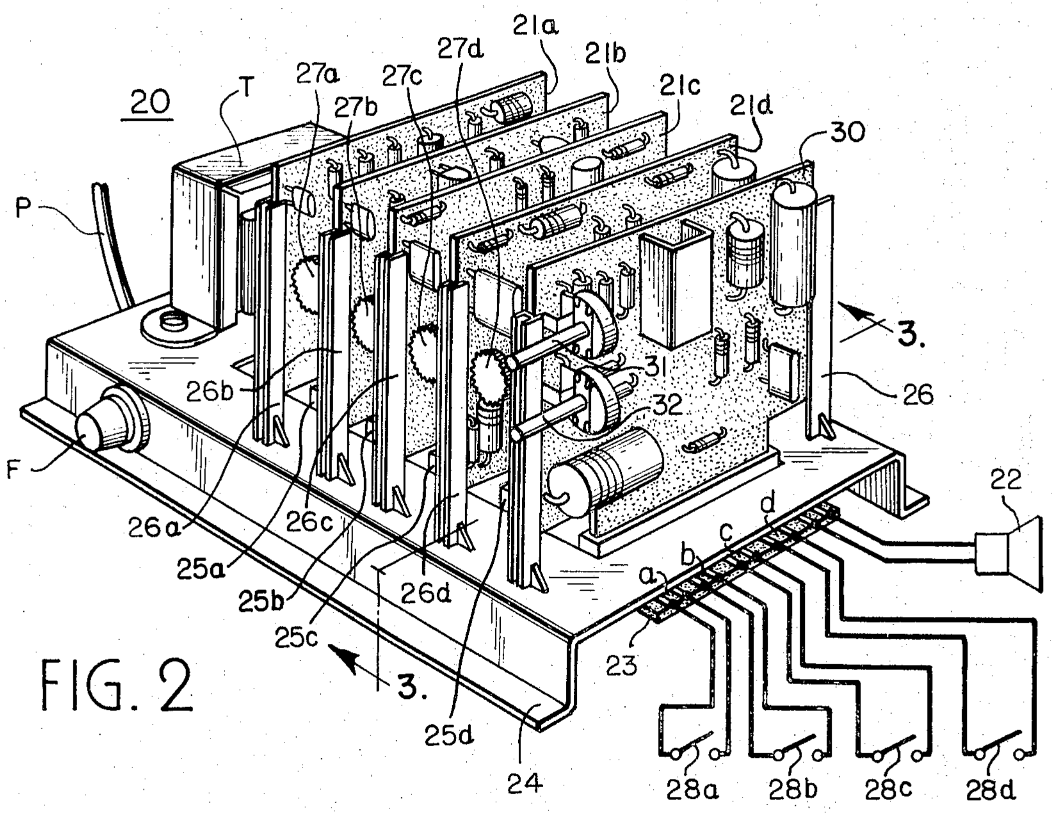
FIG. 2

PATENTED AUG 20 1974

3,831,172

SHEET 3 OF 4

SOLID-STATE SOUND EFFECT GENERATING SYSTEM

The present invention relates to solid-state sound effect generating systems generally, and more particularly to such systems used in conjunction with coin-operated amusement devices in which it is desirable to accompany the occurrence of each of certain events with a corresponding predetermined sound effect.

Sound effect generating systems are widely used for various applications where it is not convenient or possible to have the actual sound. Such applications include radio and television studios, stage plays, movies, phonograph recording studios, and even as accompaniment for some live-entertainment performers. One particular application which is becoming increasingly popular is that of coin-operated amusement games of the type in which various events such as scoring or actions (e.g., motorcycles, flying airplanes, roving tanks, the firing of guns, and even the landing/docking of "spaceships") are made to seem more realistic, especially to the children who usually play them, by accompanying each event with the sound effect naturally associated therewith. Quite obviously, the more realistic the sound effects are, and the greater the number of sound effects provided in a given game, the more popular the game may become.

One method of generating realistic sound effects is to make a magnetic recording of the actual sound on a continuous-loop magnetic tape and have this tape played back whenever the event associated therewith occurs in the game. This method, of course, involves providing a magnetic play-back system, including a magnetic play-back head, amplifiers, loudspeakers, a motor system to drive the tape, and a relatively sophisticated cueing mechanism to start and stop the tape at the appropriate times. With frequent and erratic use, especially such as that to which amusement games are generally subjected, magnetic tape soon becomes noisy which detracts from the sound effect recorded thereon. In addition, dirt accumulates on the tape and tape lubrication deteriorates, both of which substantially increase the amount of wear on the recording head, thereby decreasing operating efficiency and increasing frequency of repair or replacement. Moreover, as with any device having moving parts, the cueing and drive mechanisms of magnetic tape systems are often subject to misadjustment malfunction, and eventual inoperativeness.

Another approach to the problem of providing sound effects is an electronic or mechanical approach which consists of designing a specific system for a particular application. By various switching arrangements, several sound effects are produced by a single complex circuit or device. However, not only is servicing such a system inconvenient and relatively expensive but, moreover, amusement games by their very nature are quite faddish and therefore often lose their appeal after a relatively short period of time. Consequently, with this approach, not only does the exterior physical appearance (i.e., the lights, pictures, controls, etc.) of the game become obsolete, but also the interior sound effect system as well. The cost of updating the game thus may become so prohibitive that the game may usually be scrapped instead.

It is therefore an object of the invention to provide an improved solid-state sound effect generating system.

It is another object of the invention to provide such an improved system which is highly adaptable to a coin-operated amusement game and which provides simple and inexpensive substitution of sound effects and reliable operation without cueing.

These and other objects of the invention are more particularly set forth in the following detailed description and in the accompanying drawings, of which:

FIG. 1 is a perspective view of a typical amusement game employing a preferred embodiment of the invention;

FIG. 2 is a perspective view of a sound effect generating system in accordance with a preferred embodiment of the invention which may be used with the amusement game shown in FIG. 1;

FIG. 3 is a sectional view, partially broken away, taken along line 3—3 of FIG. 2;

Figures 4, 5:
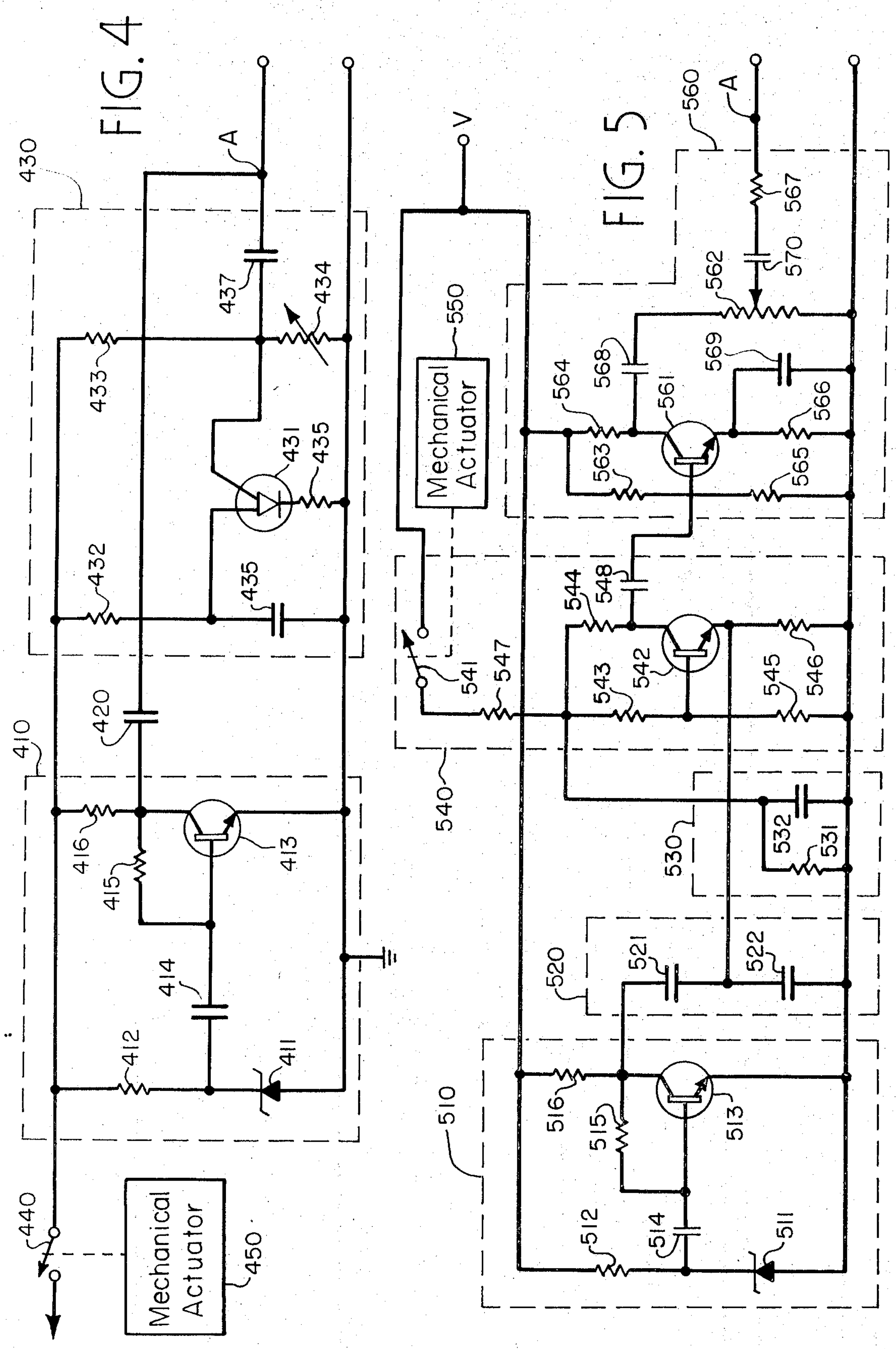
FIG. 4 is an electrical schematic diagram of a circuit utilized in the preferred embodiment of the invention shown in FIGS. 1 and 2 to generate the sound effect of a jet engine.
FIG. 5 is an electrical schematic diagram of a circuit utilized in the preferred embodiment of the invention shown in FIGS. 1 and 2 to generate the sound effect of gun fire.

With reference to FIG. 1, there is generally shown a typical coin-operated amusement device 10 which employs a preferred embodiment of the invention symbolically shown in dashed-outline form as block 20 and discussed below in greater detail with reference to FIG. 2. Device 10 represents any of a number of similar amusement devices in which the operator (not shown) manipulates a control member 12, or the like, to maneuver a device (not shown) which is typically visible through a glass window 13. Control member 12 may be used as the steering mechanism for an airplane, armored tank, motorcycle, etc., and, if desired, may further include various pushbuttons 15 for actuating breaks, accelerators, guns, sirens, etc. For example, control member 12 may represent the handlebars of a motorcycle to permit the maneuvering of a scaled-down model of a motorcycle (not shown) which is typically visible through window 13. A roadway or obstacle course or the like (also not shown) is also commonly visible to the operator through window 13. The typical object of the game is to maneuver the motorcycle down the roadway or through the obstacle course in such a manner as to avoid as many objects as possible at the highest possible speed. As the game progresses, the operator is rated in some manner, such as by counting the number of collisions verses distance traveled, and various scoring indicators are actuated behind window 13 and/or on the front of the game by various lights or dials symbolically represented here at 14.

In an attempt to add realism to the game, it is quite desirable to have specific game events accompanied by corresponding predetermined sound effects. For the motorcycle game example described above, it might be desirable to incorporate sound effects of not only the motorcycle as it traverses the course, but also of the collisions when various obstacles are not avoided, police sirens when traffic laws are not obeyed, screeching tires when the brakes are applied suddenly, and the like. Similarly, in another game, where control 12 is used to represent the steering mechanism of an airplane, dials 14 the navigational instruments, and window 13 the windshield of the cockpit, the object of the game then might be to shoot down enemy planes by machine gun, drop bombs on or fire rockets at designated targets, or climb or dive to avoid enemy planes or missiles. Quite obviously, each of these events also has a very distinct sound effect which, if incorporated in the amusement game, would also add considerably to the overall realism and enjoyment of the game. In addition, it may be desirable in some games to have the scoring accompanied by the sound effect of a siren, whistle, etc.

Applicant's invention, as hereinafter described in greater detail, not only generates such sound effects electronically, but also facilitates the substitution of one sound effect for another in a very convenient and inexpensive manner so that the basic game may be changed from, for example, a "motorcycle" to a "jet plane" without replacing the entire system. Also, the same basic system parts may be manufactured and supplied for many different games.

Referring now to FIG. 2, generally, there is shown a preferred embodiment of the invention of an improved system 20 for selectively generating a plurality of sound effects comprising a plurality of interchangeable plug-in printed circuit boards 21*a*, 21*b*, 21*c*, and 21*d*, and a non-interchangeable circuit board 30. Each circuit board has mounted thereon an electronic circuit capable of being actuated to produce an electrical output signal representative of a unique one of the sound effects desired, as hereinafter described in greater detail. Each circuit board is further provided with a series of electrical contacts formed on a portion of its lower edge to create a plug to mate with corresponding jacks in the control chassis 24 (see FIG. 3). Electromechanical transducer means are provided in the form of a loudspeaker 22 which is coupled to the circuits on circuit boards 21*a* – 21*d* by means of an additional circuit board or so-called "mother board" 23 mounted horizontally beneath control chassis 24. Loud-speaker 22 is responsive to the electrical output signal from the circuits on circuit boards 21*a* – 21*d* for converting these electrical output signals into the desired sound effects. Control chassis 24 has a corresponding plurality of jacks 25*a*, 25*b*, 25*c*, and 25*d* for interchangeably receiving and supporting the edge-mounted circuit boards 21*a* – 21*d*, respectively. Mechanical reinforcement for circuit boards 21*a* – 21*d* is provided on both ends of the boards by a pair of longitudinally-grooved support members 26*a*, 26*b*, 26*c*, and 26*d*, respectively. Boards 21*a* – 21*d* are received by control chassis 24 by sliding the boards into the grooves until the plugs made with the jacks whereupon electrical contact is made with circuit board 23. Circuit board 30 represents a non-interchangeable board which is received and supported by control chassis 24 in a similar manner and upon which is mounted electronic circuitry common to the circuits of boards 21*a* – 21*d* (e.g., additional amplification, tone control, volume control, power supply, and the like). Circuit board 23 also couples switching means, here shown as four normally open switches 21*a*, 21*b*, 21*c*, and 21*d* coupled to circuit board 23 at terminals *a*, *b*, *c*, and *d*, respectively, to the electronic circuits. Each switch is responsive to the occurrence of a specific event in the amusement game for selectively actuating the corresponding electronic circuit to thereby simultaneously accompany a particular event with its associated sound effect.

More particularly, control – 24 of system 20 includes a power cord P to connect the system to a suitable source of power such as the 110-volt AC electrical power source commonly found in most homes and office buildings. In addition, a power transformer T is provided to reduce the source voltage to that desired for the system and a fuse F is provided to guard against short circuits in the conventional manner. Circuit board 30 preferably supports the power supply circuitry, audio power amplifier circuitry, and any other auxiliary circuitry common to the circuits of circuit boards 21*a* –21*d*. Also mounted on circuit board 30 are two controls 31 and 32 which may be used to adjust the volume and tone of the audio output signal to suit the particular application in which the illustrated embodiment of the invention is practiced. The desired output signal level of each sound effect is obtained by having individual amplitude controls 27*a*, 27*b*, 27*c*, and 27d on circuit boards 21*a*, 21*b*, 21*c*, and 21*d*, respectively. While circuit board 30 is not made interchangeable with circuit boards 21*a* – 21*d*, it nevertheless may be made interchangeable with circuit boards similar to it but having audio power amplifier circuits of different output signal capabilities.

Thus, it may be seen that the illustrated embodiment of the invention provides for convenient interchanging of sound effects with minimal cost and delay. For example, if the circuit of board 21*a* were designed to simulate the sound of a motorcycle, in response to the contact closure of siwtch 28*a* by the depressing of the accelerator (not shown) on game 10 of FIG. 1, and it was desired to change game 10 from that of a "motorcycle" to that of a "jet fighter," card 21*a* would be removed from control chassis 24 and a similar card (not shown) having a circuit mounted thereon for generating the sound effect of a jet engine would be substituted therefor. Circuit boards 21*b*, 21*c*, and 21*d* may also be replaced in a similar manner. Other than changing the exterior appearance of game 10, none of the switching mechanisms, control chassis, loudspeaker, etc. would need to be replaced. Consequently, the basic structure of the game would not become obsolete and the cost of changing it to a new game would be merely that of the new plug-in circuit boards.

FIG. 3 shows the plug-in circuit board feature of the illustrated embodiment of the invention shown in FIG. 2. The sectional view taken along line 3—3 of FIG. 2 provides a more detailed view of circuit board 21*d*, its reinforcement members 26*d*, plug portion 23*d*, control chassis 24, jack 25*d*, and common circuit board 23. The partially broken away portion shows in detail the electrical contacts 29*d* of plug portion 23*d*.

FIGS. 4 through 8 are each electrical schematic diagrams of circuits used to generate different sound effects. In general, each circuit comprises a random noise generator for developing an electrical signal having a random audio frequency spectrum. Filtering means are coupled to the random noise generator to obtain an audio frequency signal having a preselected frequency characteristic appropriate for the sound effect being developed. Means are coupled to the filtering means for modulating the preselected-frequency signal to produce a desired signal corresponding to the sound effect being developed. Finally, gating means are coupled to the generating means and modulating means for enabling application of the desired signal to the output of the circuit only in response to an external command or trigger signal, to thereby develop the electrical output signal representative of the predetermined sound effect desired. The external command or trigger signal may be supplied in any conventional manner and, since the particular means for supplying it forms no part of the invention, it is symbolically shown in each circuit as a block labeled "mechanical actuator." In some of the illustrated embodiments, it is desirable to include an audio preamplifier in order to obtain an output signal at an increased amplitude suitable for application to an audio power amplifier. In each embodiment, the particular type of filtering and modulation required to obtain the most accurate representation of the sound effect desired is determined empirically. In other words, a recording of the actual sound effect desired is made and then displayed graphically on an oscilliscope, oscillograph, or the like. The output of the circuit designed to develop the electrical signal representative of the recorded sound effect is also graphically displayed so that it can be compared to that of the actual sound effect and then the individual circuit components and their interconnections are adjusted to obtain the closest possible match. Alternatively, an audio spectrum analyzer may be employed in a well-known manner to analyze the components of the recorded sound, and the circuit parameters are then adjusted to produce corresponding frequency components to synthesize the sound.

More particularly, with reference to FIG. 4, there is shown an electrical schematic diagram of a circuit which may be employed in a preferred embodiment of the invention for developing an electrical output signal at the output terminal A, in response to the application of an external command or trigger signal, representative of the sound made by a jet engine such as that used in a military fighter plane. Random noise generating means 410 for generating an electrical signal having a random audio frequency spectrum comprises a Zener or avalanche-breakdown diode 411 which is operated at a specific operating point by means of diode-biasing resistor 412 so that a white noise or "swishing" signal is generated and coupled to the base electrode of an amplifying transistor 413 by means of a coupling capacitor 414. Transistor-biasing resistors 415 and 416 are employed in a conventional manner to operate transistor 413 as a standard Class A audio amplifier.

The random-frequency audio range signal thus generated is coupled to a modulating means 430 by a filtering means in the form of a capacitor 420. The value of capacitor 420 is selected to establish a high-pass filter with a cutoff frequency of approximately 2,000 Hertz so that relatively low audio frequency signal components generated by random frequency generator 410 are not coupled to modulator 430. In this embodiment of the invention, the preselected-frequency signal of filter 420 is coupled to modulator 430 at output terminal A thereof. Modulator 430 comprises an anode-gated silicon controller rectifier (SCR) 431 which, together with biasing resistors 432, 433, 434, 435, and timing capacitor 436, operates as a relaxation oscillator with a frequency of oscillation of approximately 3,500 Hertz. The oscillating signal is coupled to output terminal A by means of a coupling capacitor 437 to thereby amplitude modulate the preselected-frequency signal also present at terminal A to produce a desired signal corresponding to the sound effect being produced. SCR-biasing resistor 434 is made adjustable to provide a pitch adjustment to simulate acceleration/deacceleration of the "jet engine."

A gating means in the form of a switch 440 is coupled to generator 410 and modulator 430 by way of the DC power supply line L leading to voltage source V. Switch 440 is responsive to an external trigger signal supplied by a mechanical actuator 450 to enable application of the desired electrical output signal to the output terminal A only in response to the external trigger signal. Thus, when mechanical actuator 450 closes switch 440, as for example when the engine-accelerator switch on the front of the "jet plane" game is depressed, voltage V is applied to generator 410 and modulator 430 so that they are both energized and thereby develop an electrical output signal representative of a predetermined sound effect (i.e., a jet engine noise) at output terminal A.

An example of one specific construction of the circuit of FIG. 4 in accordance with the preferred embodiment of the invention has been built and performed satisfactorily utilizing substantially the following circuit values and parameters:

| | |
|---|---|
| Resistor 412 | 560K ohms |
| Resistor 415 | 1M ohms |
| Resistor 416 | 10M ohms |
| Resistor 432 | 1M ohms |
| Resistor 433 | 22K ohms |
| Resistor 434 | 47K ohms |
| Resistor 435 | 680 ohms |
| Capacitor 414 | 0.047 microfarad |
| Capacitor 420 | 0.0033 microfarad |
| Capacitor 436 | 0.001 microfarad |
| Capacitor 437 | 0.22 microfarad |
| Diode 411 | 1N758 |
| Anode-gated SCR 431 (Programmable Unijunction Transistor) | 2N6027(G.E.) |
| Transistor 413 | 2N3394 |
| Supply Voltage V | +18 volts |

With respect to FIG. 5, there is shown in particular an electrical schematic diagram of a solid-state electronic circuit for developing at the output terminal A of the circuit, in response to the application of an external trigger signal, an electrical output signal representative of the sound of gunfire. Random noise generating means 510 for generating an electrical signal having a random audio-frequency spectrum comprises an avalanche-breakdown or Zener diode 511, a diode-biasing resistor 512, an amplifying transistor 513, a coupling capacitor 514, and transistor-biasing resistors 515 and 516. Generator 510 operates in a manner quite similar to generator 410 of FIG. 4, although the values of the resistors and capacitors are slightly changed in order to emphasize those frequencies in the audio-frequency spectrum that comprise the frequency spectrum of the sound of gunfire.

Filtering means 520 in the form of two capacitors 521 and 522 is coupled to generating means 510 for filtering the random-frequency signal to obtain an audio-frequency signal having a preselected freqency characteristic. For this particular sound effect, gunfire, the value of capacitor 521 is selected such that more low-frequency components (e.g., below 400 Hertz) are passed than high-frequency components and the value of capacitor 522 is selected such that most of the high-frequency components are bypassed to ground.

Modulating means 530 is provided for modulating the preselected-frequency signal to produce a desired signal corresponding to the sound effect being developed. Modulator 530 comprises a timing resistor 531 and a storage capacitor 532 which cooperate with a gating means 540 to amplitude-modulate the output signal of filtering means 520, as described below in greater detail in conjunction with the discussion of the gating means.

Gating means 540 is coupled to generating means 510 and modulating means 530 for enabling application of the desired signal to output terminal A only in response to an external trigger signal supplied by a mechanical actuator 550. Gating means 540 comprises a mechanical momentary-contact switch 541 and a switching transistor 542 together with transistor-biasing resistors 543, 544, 545, and 546. Switch 541 is momentarily closed in response to the external trigger signal from mechanical actuator 550 when the associated game event occurs (e.g., a gun trigger is pulled on the front of the game). The contact closure of switch 541 applies a suitable supply voltage V to switching transistor 542 by means of resistor 547 and the transistor-biasing resistor network to bias switching transistor 542 to the conductive or ON state. Conversely, when momentary-contact switch 541 opens, switching transistor 542 immediately returns to its quiescent non-conductive or OFF state. The contact closure of switch 541 also applies voltage V to the junction of resistor 531 and capacitor 532 of modulator 530. Without modulator 530, the application of voltage V to switching transistor 542 would momentarily couple the signal from filtering means 520 through switching transistor 542 to the base electrode of an amplifying transistor 561 of an amplifying stage 560, to thus produce a short burst of the preselected-frequency signal at output terminal A. With the addition of modulator 530, however, the operation of transistor 542 is altered to amplitude-modulate the preselected-frequency signal to generate an output signal that more closely approximates the sound effect of gunfire. Instead of switching transistor 542 abruptly turning off when momentary-contact switch 541 opens, the charge stored by storage capacitor 532 discharges through switching transistor 542, and its associated biasing network, to gradually turn off switching transistor 542 so that an exponentially diminishing amplitude results. Once again, the values of timing resistor 531 and 547 are determined empirically in order to obtain best representation of the desired signal.

In the embodiment of FIG. 5, amplifying stage 560 is added to increase the amplitude of the desired output signal for application to a suitable loudspeaker (not shown, see FIG. 2). In addition, a potentiometer 562 is incorporated in amplifying stage 560 to permit adjustment of the amplitude of the output signal to suit different applications.

An example of one specific construction of the circuit of FIG. 5 in accordance with the preferred embodiment of the invention has been built and performed satisfactorily utilizing substantially the following circuit values and parameters:

| | |
|---|---|
| Resistor 512 | 1M ohms |
| Resistor 515 | 1M ohms |
| Resistor 516 | 10K ohms |
| Resistor 531 | 39K ohms |
| Resistor 543 | 100K ohms |
| Resistor 544 | 10K ohms |
| Resistor 545 | 22K ohms |
| Resistor 546 | 10K ohms |
| Resistor 547 | 1K ohms |
| Resistor 562 | 50K ohms |
| Resistor 563 | 270K ohms |
| Resistor 564 | 18K ohms |
| Resistor 565 | 12K ohms |
| Resistor 566 | 560 ohms |
| Resistor 567 | 22K ohms |
| Capacitor 514 | 0.22 microfarad |
| Capacitor 521 | 5 microfarads |
| Capacitor 522 | 1 microfarad |
| Capacitor 532 | 5 microfarads |
| Capacitor 548 | 0.22 microfarad |
| Capacitor 568 | 0.22 microfarad |
| Capacitor 569 | 10 microfarads |
| Capacitor 570 | 0.22 microfarad |
| Diode 511 | 1N758 |
| Transistor 513 | 2N3394 |
| Transistor 542 | 2N3394 |
| Transistor 561 | 2N3394 |
| Supply Voltage V | +18 volts |

Figures 6, 7:
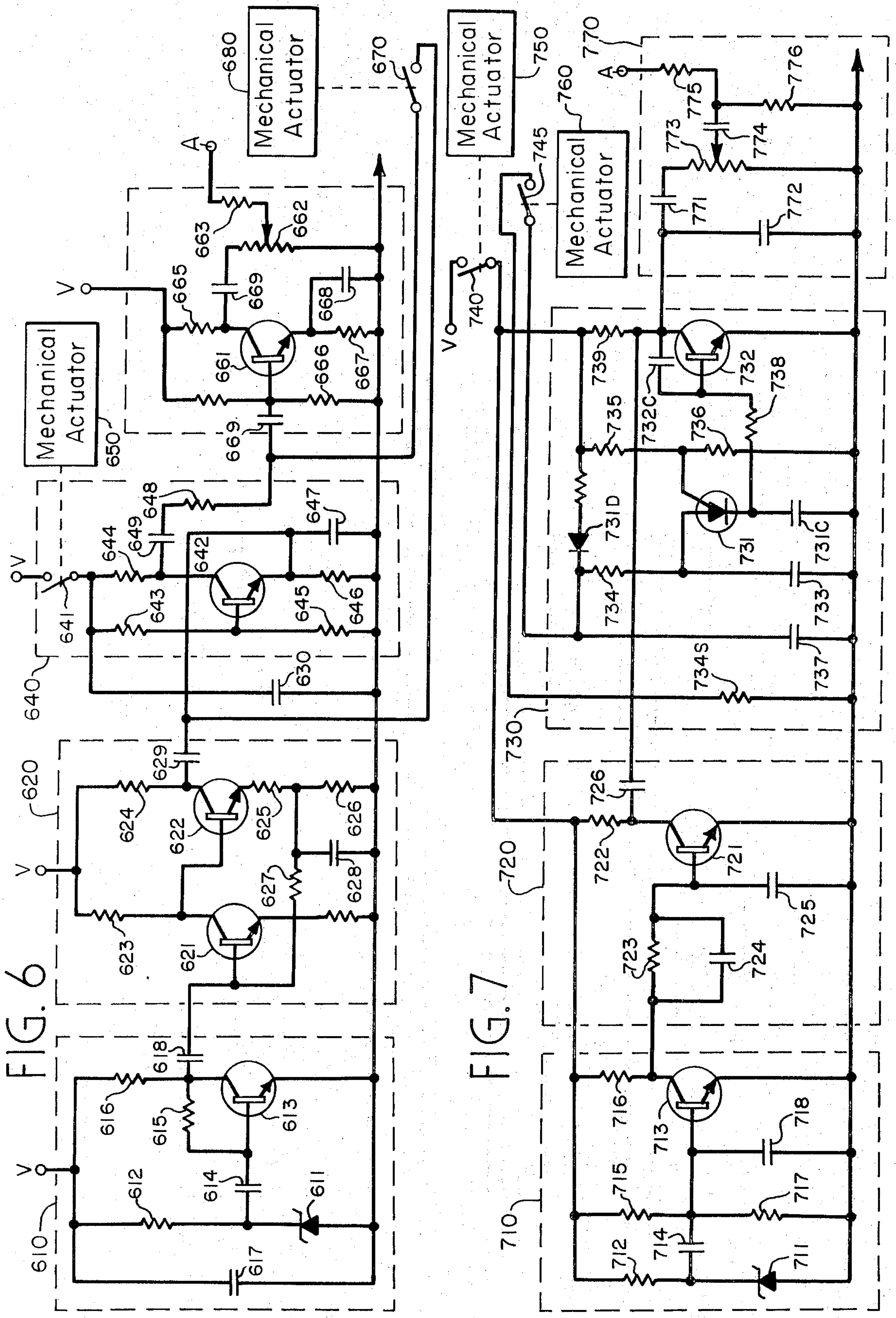
FIG. 6 is an electrical schematic diagram of a circuit utilized in the preferred embodiment of the invention shown in FIGS. 1 and 2 to generate the sound effect of an explosion.
FIG. 7 is an electrical schematic diagram of a circuit utilized in the preferred embodiment of the invention shown in FIGS. 1 and 2 to generate the sound effect of an armored tank.

With reference to FIG. 6, there is shown in particular an electrical schematic diagram of a solid-state electronic circuit for developing at the output terminal A of the circuit, in response to the application of an external trigger signal, an electrical output signal representative of the sound of an explosion. The circuit comprises noise generating means 610 for generating an electrical signal having a random audio-frequency spectrum. Generating means 610 comprises an avalanche-breakdown or Zener diode 611, a diode-biasing resistor 612, an amplifying transistor 613, a coupling capacitor 614 and transistor-biasing resistors 615 and 616. The circuit is coupled to a suitable voltage source V and operated in a manner similar to generating means 410 of FIG. 4 and 510 of FIG. 5 with the exception of a decoupling capacitor 617 which is included to filter any 60-cycle or "hum" components that may be present in voltage V.

Filtering means 620 is coupled to generating means 610 for filtering the random-frequency signal therefrom to obtain an audio-frequency signal having a preselected frequency characteristic for an explosive sound. For this purpose, the circuit of FIG. 6 includes a pair of transistors 621 and 622 with their respective load resistors 623 and 624. The signal from generating means 610 is coupled to filtering means 620 by a coupling capacitor 618, the value of which is selected to be high enough to pass essentially all of the frequency components of the signal generated by generating means 610. A pair of emitter resistors 625 and 626 are included with transistor 622 to provide a feedback signal source. A feedback signal path is established from the junction of emitter resistors 625 and 626 through feedback resistor 627 to the base of transistor 621. A filtering capacitor 628 is coupled from the feedback path to ground as shown to bypass to ground any AC signal components at the junction of resistors 625 and 626 so that the feedback path operates only with respect to DC signal components. In addition, the value of resistor 627 is selected low enough so that the capacitor 628 also acts to filter some of the high-frequency components from the signal applied to the base electrode of transistor 621.

Gating means 640 is coupled to generating means 610 by way of filtering means 620 for enabling application of the desired signal to output terminal A only in response to an external trigger signal. Gating means 640 includes a momentary-contact switch 641 which is actuated by a mechanical actuator 650 in accordance with the particular game event associated with the sound effect being generated. The closing of switch 641 applies voltage source V to switching transistor 642 by way of transistor-biasing resistors 643, 644, 645, and 646 to cause switching transistor 642 to be biased in the conductive or ON state. Voltage V is concomitantly applied to a modulating means in the form of a storage capacitor 630 so that switching transistor 642 gradually returns to its quiescent non-conductive or OFF state after momentary-contact switch 641 is opened to thus amplitude-modulate the preselected-frequency signal to produce the desired output signal in a manner very similar to that described above with reference to FIG. 5. In other words, biasing switching transistor 642 into the conductive state enables a signal appearing at the collector of filtering transistor 622 to be applied by means of coupling capacitors 629, 649, and 659 to the base electrode of an amplifying transistor 661 of an amplifying stage 660. By gradually returning switching transistor 642 to the non-conductive state, via the discharging of storage capacitor 630, the amplitude of the signal coupled therethrough is gradually diminished to obtain an output signal which more closely approximates the sound of an explosion. Amplifying stage 660 is included to provide amplification of the electrical signal representative of the explosion sound effect to a desired level which may be adjusted by means of a potentiometer 662.

The explosion sound effect is typically desirable in connection with a game event such as when a properly aimed missile, rocket, bullet, etc., hits a target. In the event the target is missed, it is often desirable to have a sound effect that indicates this, in which case means such as a switch 670 operated by a mechanical actuator 680 may be used to bypass modulating means 630 and gating means 640 and thus couple the output signal of filtering means 620 directly to the input of amplifying means 660.

An example of one specific construction of the circuit of FIG. 6 in accordance with the preferred embodiment of the invention has been built and found to perform satisfactorily utilizing substantially the following circuits values and parameters:

| | |
|---|---|
| Resistor 612 | 180K ohms |
| Resistor 615 | 1M ohms |
| Resistor 616 | 10K ohms |
| Resistor 623 | 47K ohms |
| Resistor 624 | 10K ohms |
| Resistor 625 | 82 ohms |
| Resistor 626 | 1K ohms |
| Resistor 627 | 680 ohms |
| Resistor 643 | 100K ohms |
| Resistor 644 | 10K ohms |
| Resistor 645 | 22K ohms |
| Resistor 646 | 10K ohms |
| Resistor 648 | 1K ohms |
| Resistor 662 | 50K ohms |
| Resistor 663 | 22K ohms |

-Continued

| | |
|---|---|
| Resistor 664 | 270K ohms |
| Resistor 665 | 18K ohms |
| Resistor 666 | 12K ohms |
| Resistor 667 | 560 ohms |
| Capacitor 614 | 1 microfarad |
| Capacitor 617 | 100 microfarads |
| Capacitor 618 | 5 microfarads |
| Capacitor 628 | 10 microfarads |
| Capacitor 629 | 5 microfarads |
| Capacitor 630 | 5 microfarads |
| Capacitor 647 | 1 microfarad |
| Capacitor 649 | 15 microfarads |
| Capacitor 668 | 10 microfarads |
| Capacitor 669 | 0.22 microfarad |
| Diode 611 | 1N758 |
| Transistor 613 | 2N3394 |
| Transistor 621 | 2N3394 |
| Transistor 622 | 2N3394 |
| Transistor 642 | 2N3394 |
| Transistor 661 | 2N3394 |
| Supply Voltage V | +18 volts |

With respect to FIG. 7, there is shown in particular, an electrical schematic diagram in accordance with the preferred embodiment of the invention of an electronic circuit for developing at the output terminal A, in response to the application of an external trigger signal, an electrical output signal representative of the sound made by an armored tank as it travels overland. The circuit comprises noise generating means 710 for generating an electrical signal having a random audio-frequency spectrum. Generating means 610 includes an avalanche-breakdown or Zener diode 711, a diode-biasing resistor 712, an amplifying transistor 713, a coupling capacitor 714 and transistor-biasing resistors 715, 716, and 717, and operates in a manner very similar to generators 410, 510, and 610 of FIGS. 4, 5, and 6, respectively. In addition, a filtering capacitor 718 is coupled from the base of transistor 713 to ground as shown to shunt some of the high-frequency signal components (e.g., 1000 Hertz and above) to ground.

Filtering means 720 is coupled to generating means 710 for filtering the random-frequency signal to obtain an audio-frequency signal having a preselected frequency characteristic for an armored tank sound. Filtering means 720 includes an amplifying transistor 721 having a suitable load resistor 722. The filtering to obtain the desired frequency characteristic is implemented by an RC coupling network comprising the parallel combination of a resistor 723 and a capacitor 724, and a shunt capacitor 725 which shunts some of the high-frequency signal components (e.g., 600 Hertz and above) from the base of amplifying transistor 721 to ground.

A modulating means 730 is coupled to the output of filtering means 720 by coupling capacitor 726 for modulating the preselected-frequency signal to produce the desired signal corresponding to the sound effect of an armored tank. Modulating means 730 includes anode-gated silicon controlled rectifier (SCR) 731 and an amplifying transistor 732. SCR 731, in conjunction with a timing capacitor 733 and SCR-biasing resistors 734, 735, and 736, operates as a relaxation oscillator which, when coupled to the base of amplifying transistor 732, amplitude-modulates the preselected-frequency signal coupled to the collector of transistor 732 (by coupling capacitor 726) to generate the desired electrical output signal. For this circuit, the oscillating frequency of the relaxation oscillator is made equal to approximately 100 Hertz so that the oscillating signal periodically increases and decreases the amplitude of the preselected-frequency signal at the rate of 0.5 Hertz to simulate the sound of an armored tank.

At the output of modulating means 730, an additional circuit 770 is provided for tailoring the frequency characteristic of the output signal of modulating means 730 to more closely approximate the sound of an armored tank. A relatively large-value capacitor 771 is serially connected in the main signal path and a relatively small-value capacitor 772 is connected in parallel with the main signal path so that the high-frequency (e.g., above 600 Hertz) components of the signal are bypassed to ground and only the low-frequency components are passed on to output terminal A. In addition, a potentiometer 773 is provided as shown to enable the amplitude of the output signal to be varied to suit the particular application.

In the embodiment of the invention shown in FIG. 7, gating means in the form of a switch 740 are provided which, in response to actuation by a mechanical actuator 750, apply a suitable voltage source V to amplifying transistors 721 and 732, thereby enabling application of the desired output signal to output terminal A only in response to an external trigger signal. An additional mechanical actuator 760 is used to operate a switch 745 and modulating means 730 to couple an additional timing resistor 734S and timing capacitor 737 to the SCR 731 to decrease the frequency of oscillation of the relaxation oscillator and thereby simulate the sound effect of an armored tank traveling at a slower speed.

An example of one specific construction of the circuit of FIG. 7 in accordance with the preferred embodiment of the invention has been built and performed satisfactorily utilizing substantially the following circuit values and parameters:

| | |
|---|---|
| Resistor 712 | 150K ohms |
| Resistor 715 | 220K ohms |
| Resistor 716 | 12K ohms |
| Resistor 717 | 62K ohms |
| Resistor 722 | 12K ohms |
| Resistor 723 | 1M ohms |
| Resistor 734 | 1M ohms |
| Resistor 734S | 82K ohms |
| Resistor 735 | 22K ohms |
| Resistor 736 | 22K ohms |
| Resistor 738 | 1K ohms |
| Resistor 739 | 4.7K ohms |
| Resistor 773 | 50K ohms |
| Resistor 775 | 270K ohms |
| Resistor 776 | 18K ohms |
| Capacitor 714 | 10 microfarads |
| Capacitor 718 | 1 microfarad |
| Capacitor 724 | 0.22 microfarad |
| Capacitor 725 | 0.047 microfarad |
| Capacitor 726 | 0.22 microfarad |
| Capacitor 731C | 1 microfarad |
| Capacitor 732C | 0.02 microfarad |
| Capacitor 733 | 0.068 microfarad |
| Capacitor 737 | 25 microfarads |
| Capacitor 771 | 10 microfarads |
| Capacitor 772 | 0.022 microfarad |
| Capacitor 774 | 15 microfarads |
| Diode 711 | 1N758 |
| Anode-gated SCR 731 (Programmable Unijunction Transistor) | 2N6027 |
| Diode 731D | A14A |
| Transistor 713 | 2N3394 |
| Transistor 721 | 2N3394 |
| Transistor 732 | 2N3394 |
| Supply Voltage V | +18 volts |

Figure 8:
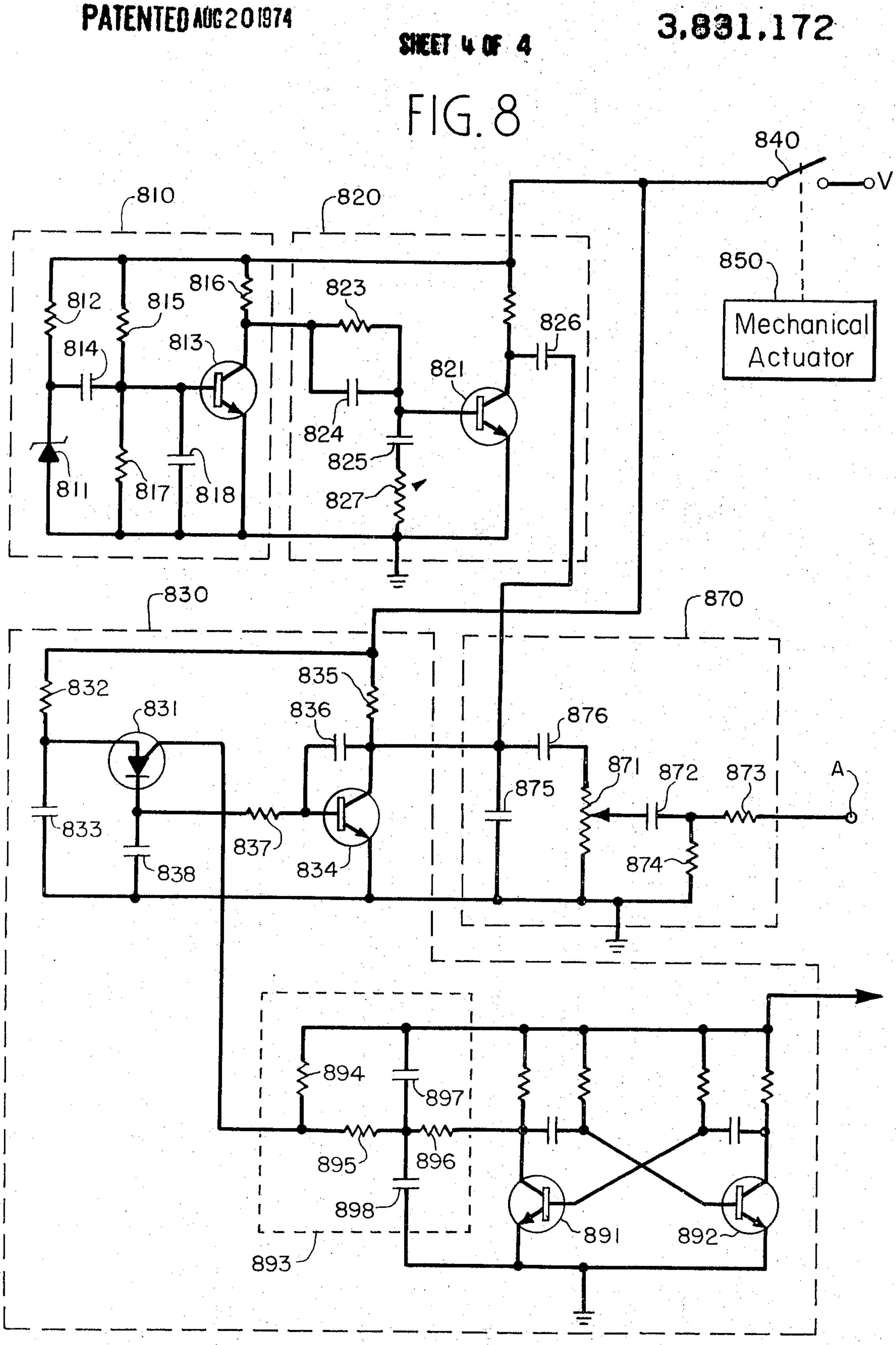
FIG. 8 is an electrical schematic diagram of a circuit utilized in the preferred embodiment of the invention shown in FIGS. 1 and 2 to generate the sound effect of a propeller-driven airplane.

With respect to FIG. 8, there is shown in particular an electrical schematic diagram in accordance with the preferred embodiment of the invention of an electronic circuit for developing at the output terminal A, in response to the application of an external trigger signal, an electrical output signal representative of the sound of a propeller-driven airplane with an automatic "climb" and "drive" feature. The circuit comprises noise generating means 810 for generating an electrical signal having a random audio-frequency sprectrum, and operates in a manner very similar to generator 710 of FIG. 7. Generating means 810 includes an avalanche-breakdown or Zener diode 811, a diode-biasing resistor 812, an amplifying transistor 813, a coupling capacitor 814, and biasing resistors 815, 816, and 817. In addition, a bypass capacitor 818 is included from the base of transistor 813 to ground in order to eliminate high-frequency components (e.g., above 1,000 Hertz) from the output signal.

Means 820 are coupled to the generating means at the collector of amplifying transistor 813 for filtering the random-frequency signal to provide an audio-frequency signal having a preselected frequency characteristic for a propeller-driven airplane sound. Filtering means 820 includes an amplifying transistor 821 and a suitable load resistor 822. Filtering is accomplished by a serially-connected RC coupling circuit comprising the parallel combination of a resistor 823 and a capacitor 824 together with a shunt-connected RC network comprising the series combination of a capacitor 825 and a variable resistor 827. By making resistor 827 variable, some tone adjustment is provided.

Means 830 are coupled to filtering means 820 for modulating the preselected-frequency signal to produce a desired signal corresponding to the sound of a propeller-driven airplane. Modulating means 830 includes an anode-gated silicon controlled rectifier (SCR) 831 with its associated biasing resistor 832 and timing capacitor 833 which together operate as a relaxation oscillator. Modulating means 830 further comprises an amplifying transistor 834, a load resistor 835, and a feedback capacitor 836. The cathode of SCR 831 is coupled to the base of amplifying transistor 834 by a coupling resistor 837 to provide an amplified oscillating modulating signal at the collector of amplifying transistor 834. By making the frequency of oscillation equal to an audio frequency of approximately 300 Hertz and combining this signal with the output signal from filtering means 820 (at the collector of amplifying transistor 834), the resulting amplitude-modulated electrical signal is highly representative of the sound of a propeller-driven airplane engine. Moreover, by varying the rate of oscillation of the relaxation oscillator at a rather slow rate (e.g., one-third Hertz), the sound effect thus generated closely resembles that of a propeller-driven airplane which is climbing and diving.

To develop the climbing and diving feature, modulating means 830 further comprises a free-running multivibrator including multivibrator transistors 891 and 892 which are operated in a conventional manner and timed to oscillate at the desired repetition rate (e.g., one-third Hertz). By coupling the collector of multivibrator transistor 891 to the anode gate of SCR 831 by means of a filter network 893, the biasing of SCR 831 is varied at the repetition rate of the multivibrator to thereby vary the frequency of oscillation of the relaxation oscillator. Filter network 893 changes the pulse-train signal developed by the multivibrator to a sine-wave signal suitable for application to the gate of SCR 831.

The output signals from filtering means 820 and modulating means 830 are combined in an output network 870 which provides some additional tailoring of the frequency response of the output signal and, by means of a potentiometer 871, enables adjustment of the output signal level. The particular values of the capacitors and resistors used in output means 870, as well as many of the others in the respective circuits, have been determined empirically to obtain the closest approximation of the sound effect desired, and may, of course, be modified for other applications.

In the schematic diagram shown in FIG. 8, gating means in the form of a switch 840 are provided which, in response to actuation by a mechanical actuator 850, apply a suitable voltage source V to amplifying transistor 813, 821, and 834 thereby enabling application of the desired output signal to output terminal A only in response to an external trigger signal.

An example of one specific construction of the circuit of FIG. 8 in accordance with the preferred embodiment of the invention has been built and performed satisfactorily utilizing substantially the following circuit values and parameters:

| | |
|---|---|
| Resistor 812 | 150K ohms |
| Resistor 815 | 220K ohms |
| Resistor 816 | 12K ohms |
| Resistor 817 | 6.2K ohms |
| Resistor 822 | 12K ohms |
| Resistor 823 | 1M ohms |
| Resistor 827 | 10K ohms |
| Resistor 832 | 1M ohms |
| Resistor 835 | 47K ohms |
| Resistor 837 | 1K ohms |
| Resistor 871 | 50K ohms |
| Resistor 873 | 22K ohms |
| Resistor 874 | 18K ohms |
| Resistor 894 | 47K ohms |
| Resistor 895 | 10K ohms |
| Resistor 896 | 47K ohms |
| Capacitor 814 | 10 microfarads |
| Capacitor 818 | 0.47 microfarad |
| Capacitor 824 | 0.22 microfarad |
| Capacitor 825 | 0.1 microfarad |
| Capacitor 826 | 0.22 microfarad |
| Capacitor 833 | 0.01 microfarad |
| Capacitor 836 | 0.022 microfarad |
| Capacitor 838 | 0.47 microfarad |
| Capacitor 872 | 0.01 microfarad |
| Capacitor 875 | 0.022 microfarad |
| Capacitor 876 | 0.22 microfarad |
| Capacitor 897 | 50 microfarads |
| Capacitor 898 | 50 microfarads |
| Diode 811 | 1N758 |
| Anode-gated SCR 831 (Programmable Unijunction Transistor) | 2N6027 |
| Transistor 813 | 2N3394 |
| Transistor 821 | 2N3394 |
| Transistor 834 | 2N3394 |
| Transistor 891 | 2N3394 |
| Transistor 892 | 2N3394 |
| Supply Voltage | +18 volts |

Thus, there has been shown and described a new and improved solid-state sound effect generating system which is highly adaptable to a coin-operated amusement game. A game constructed with the system of the invention may be easily and economically converted to a different, more popular game by simply "facelifting" the exterior and substituting new circuit boards with the desired new sound effects. The invention also provides for easy servicing. Should a board become defective, it can be replaced immediately thus avoiding costly replacement of the entire system. Moreover, with the increased speed of repairs afforded by the ease of circuit board replacement, less time, and therefore revenue, is lost while the game is "out of order." The invention also provides an improved cueing capability in that a given sound effect may be instantly stopped, started, loudened, softened, or have its pitch changed at any time during the operation of the game. The system of the invention has improved flexibility in that any number of desired sound effects may be incorporated, in any desired combination, with minimum cost and inconvenience. By having the main amplifier circuitry on a separate circuit board, the power output capability of the system may be changed to suit the particular application simply by substituting different-power amplifier boards. Other sound effects may be generated by a system in accordance with the invention by using an audio-frequency spectrum analyzer to analyze a recording of the actual sound desired to be generated to ascertain the approximate frequency composition thereof and then employ the principles of the invention to construct the appropriate circuit.

It will, of course, be understood that modifications of the present invention, in its various aspects, will be apparent to those skilled in the art, some being apparent only after study, and others being merely matters of routine electronic design. As such, the scope of the invention should not be limited by the particular embodiment and specific construction herein described, but should be defined only by the appended claims, and equivalents thereof.

Various features of the invention are set forth in the following claims.

What is claimed is:

1. In combination with an audio-visual amusement device of the type in which specific events are each accompanied by a corresponding predetermined sound effect, an improved system for selectively generating a plurality of said sound effects, comprising:

a plurality of interchangeable plug-in printed circuit boards each having mounted thereon a solid-state electronic circuit capable of being actuated to independently develop an electrical output signal representative of a unique one of said sound effects;

each said electrical circuit comprising a random noise generator for developing an electrical signal having a random audio frequency spectrum, filtering means coupled to said random noise generator for obtaining an audio frequency signal having a preselected frequency characteristic, and means for modulating said preselected frequency signal to thereby develop said output signal;

electromechanical transducer means coupled to said circuits and responsive to said electrical output signal for converting said output signal into said sound effect;

a control chassis having a corresponding plurality of jacks for interchangeably receiving and supporting said circuit boards, said chassis further having means for electrically interconnecting said received circuit boards;

and switching means coupled to said electronic circuits and responsive to the occurrence of any of said events for selectively actuating the corresponding electronic circuit to thereby simultaneously accompany a particular event with its associated sound effect.

2. An electronic sound-generating system for selectively generating a plurality of sound effects, and adapted for use with an audio-visual amusement device of the type in which specific events are each accompanied by a corresponding predetermined sound effect, comprising:

a plurality of interchangeable plug-in printed circuit boards each having mounted thereon a solid-state electronic circuit capable of being actuated to independently develop an electrical output signal representative of a unique one of said sound effects;

each said electrical circuit comprising a random noise generator for developing an electrical signal having a random audio frequency spectrum, filtering means coupled to said random noise generator for obtaining an audio frequency signal having a preselected frequency characteristic, and means for modulating said preselected frequency signal to there by develop said output signal;

electromechanical transducer means coupled to said circuits and responsive to said electrical output signal for converting said output signal into said sound effect;

a control chassis having a corresponding plurality of jacks for interchangeably receiving and supporting said circuit boards, said chassis further having means for electrically interconnecting said received circuit boards;

and switching means coupled to said electronic circuits and responsive to the occurrence of any of said events for selectively actuating the corresponding electronic circuit to thereby simultaneously accompany a particular event with its associated sound effect.

3. A circuit according to claim 1, in which said modulating means comprise an anode-gated silicon-controlled rectifier operated as a relaxation oscillator to modulate the amplitude of said preselected-frequency signal at a predetermined audio-frequency repetition rate.

4. A circuit according to claim 3, in which said modulating means further comprises a free-running monostable multivibrator coupled to said relaxation oscillator to vary the frequency of oscillation of said oscillator at a predetermined rate.

* * * * *